GEORGE W. TEASDALE, OF LEXINGTON, CALIFORNIA.

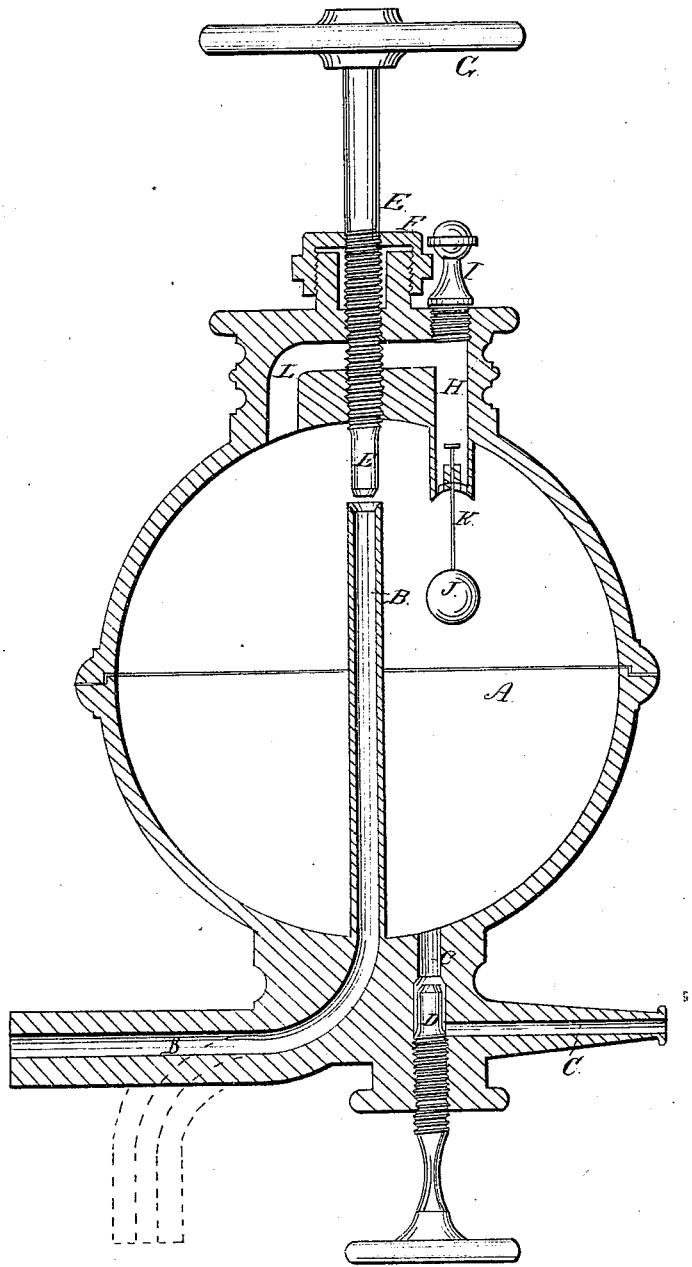

*Letters Patent No. 87,222, dated February 23, 1869.*

IMPROVEMENT IN STEAM-ENGINE LUBRICATORS.

The Schedule referred to in these Letters Patent and making part of the same.

*To all whom it may concern:*

Be it known that I, GEORGE W. TEASDALE, of Lexington, county of Santa Clara, State of California, have invented an Improved Lubricator; and I do hereby declare the following description and accompanying drawings are sufficient to enable any person skilled in the art or science to which it most nearly appertains, to make and use my said invention or improvement without further invention or experiment.

My invention relates to that class of oil-cups from which the lubricant is introduced to the cylinder, or other point of application, against the pressure of steam, and also to such as should furnish a constant supply of oil; and It consists in so constructing the globe that, after it has been filled with oil or tallow, it will allow a small quantity to pass continually to the point where it is needed, till it is all exhausted.

This is effected by constructing the globe with a discharge-pipe, passing through the bottom to the point of delivery, and rising within it to near the top. The steam rises through this pipe, and a small portion is constantly being condensed. This condensed water, by its greater gravity, sinks to the bottom of the globe, and thus raises the oil, so that it flows down the tube, and supplies a small quantity continually, till the globe is full of water, and the oil or tallow is exhausted. The water is then drawn off, by a cock at the bottom, and the globe again filled with oil.

A small float is so arranged in the upper part, that, when the globe is full, it rises and closes the supply-tube, and shows that enough has been introduced, after which the process goes on as before.

To more fully illustrate my invention, reference is had to the accompanying drawings, which show a side sectional elevation of my device.

A is the globe, constructed in sections, or as may best suit convenience, and having a tube, B, rising to near the top, within it. This tube extends out from the bottom of the globe to the point at which the lubricant is needed.

A small discharge-passage, C, for condensed water, is also formed at the bottom, and is opened or closed by the screw-cock D.

Through the top of the globe, a screw-cock, E, passes, being rendered steam-tight by the stuffing-box F.

This cock is placed so as to open and close the mouth of the supply-tube B, as desired, and is operated by the hand-wheel G.

At the top of the globe, and a little to one side of the cock E, is the passage H, through which the globe is filled, and which is closed by a stopper, I.

The passage, or tube, continues down into the globe, so that its lower end is at the same height as the top of the tube B, and it is made concave, or of such form as to be closed by a float.

The float J is shown in the drawing globular, and is attached to and guided by a stem, K, as shown.

The operation is as follows:

Whatever water may have accumulated in the globe is blown out through the passage C, which is then closed.

The plug I being removed, the oil or tallow is introduced, till the globe is full, the next space, or passage L, freeing it of air.

When the globe is filled to the top of the tube B, the float J will have risen so as to close the passage H, the stem K, and the filling of the passage, showing that it is full. The plug I is then replaced, and the cock E, which had been screwed down to close the tube B, is then opened, and the size of the passage regulated so as to allow the tallow to pass in sufficient quantity.

Steam will rise through the tube B, and a small portion will be constantly condensing, and, as it sinks by its greater specific gravity, it will gradually raise the surface of the tallow, and cause a small quantity to overflow into and pass down the tube B.

This invention is more especially valuable for use in steam-cylinders, where a constant supply of tallow is necessary, but in which it is rapidly evaporated and carried off.

Having thus described my invention,

What I claim as new, and desire to secure by Letters Patent, is—

1. In combination with the globe A, the tube B, extending to near the top, and the screw E, for regulating the supply, substantially as herein described.

2. The supply-passage H, together with the float J and stem K, for closing the passage and indicating the quantity introduced, substantially as herein described.

3. The passages C and cock D, when arranged in relation to the above, as herein described.

In witness whereof, I hereunto set my hand and seal.

G. W. TEASDALE. [L. S.]

Witnesses:
GEO. T. HEADEN,
C. E. FOX.